US009104780B2

(12) United States Patent
Ritchie et al.

(10) Patent No.: US 9,104,780 B2
(45) Date of Patent: Aug. 11, 2015

(54) SYSTEM AND METHOD FOR NATURAL LANGUAGE PROCESSING

(71) Applicants: Brian Douglas Ritchie, Maple (CA); Jared Brian Ritchie, Maple (CA); William Lark Ritchie, Porcupine (CA)

(72) Inventors: Brian Douglas Ritchie, Maple (CA); Jared Brian Ritchie, Maple (CA); William Lark Ritchie, Porcupine (CA)

(73) Assignee: Kamazooie Development Corporation (CA)

( * ) Notice: Subject to any disclaimer, the term of this patent is extended or adjusted under 35 U.S.C. 154(b) by 185 days.

(21) Appl. No.: 13/833,584

(22) Filed: Mar. 15, 2013

(65) Prior Publication Data

US 2014/0280210 A1     Sep. 18, 2014

(51) Int. Cl.
*G06F 17/30*     (2006.01)

(52) U.S. Cl.
CPC ................................ *G06F 17/30958* (2013.01)

(58) Field of Classification Search
USPC ......................................................... 707/797
See application file for complete search history.

(56) References Cited

U.S. PATENT DOCUMENTS

| | | | |
|---|---|---|---|
| 6,714,939 B2 | 3/2004 | Saldanha et al. | |
| 6,937,975 B1 | 8/2005 | Elworthy | |
| 7,340,393 B2 | 3/2008 | Mitsuyoshi | |
| 7,353,177 B2 | 4/2008 | Cosatto et al. | |
| 7,373,334 B2 * | 5/2008 | Hu ................................... | 706/46 |
| 7,555,431 B2 | 6/2009 | Bennett | |
| 7,599,861 B2 | 10/2009 | Peterson | |
| 7,899,771 B2 * | 3/2011 | Hu ................................... | 706/46 |
| 7,962,578 B2 | 6/2011 | Makar et al. | |
| 8,126,832 B2 | 2/2012 | Spring | |
| 8,135,655 B2 | 3/2012 | Oaten et al. | |
| 8,327,256 B2 * | 12/2012 | Choudhury ................... | 715/214 |
| 8,671,363 B2 * | 3/2014 | Choudhury ................... | 715/853 |
| 2006/0184487 A1 * | 8/2006 | Hu ................................... | 706/45 |
| 2006/0195407 A1 | 8/2006 | Athelogou et al. | |
| 2008/0140598 A1 * | 6/2008 | Hu ................................... | 706/46 |
| 2008/0263038 A1 | 10/2008 | Judge et al. | |
| 2009/0055342 A1 | 2/2009 | Gong et al. | |
| 2010/0125779 A1 * | 5/2010 | Choudhury ................... | 715/227 |
| 2010/0125813 A1 * | 5/2010 | Choudhury ................... | 715/853 |
| 2012/0166373 A1 | 6/2012 | Sweeney et al. | |
| 2012/0239381 A1 | 9/2012 | Heidasch | |
| 2014/0040312 A1 | 2/2014 | Gorman et al. | |

OTHER PUBLICATIONS

International Search Report and Written Opinion, PCT/CA2014/050125 dated May 9, 2014.

* cited by examiner

*Primary Examiner* — Baoquoc N To
(74) *Attorney, Agent, or Firm* — Fleck & Chumak LLP; Yuri Chumak

(57) ABSTRACT

According to embodiments described in the specification, systems and methods are provided for natural language processing. A method in a server includes receiving, at the network interface device, an input for response from an electronic device, parsing the input to identify one or more entity data values and one or more relationship data values, populating a graph data structure with the identified entity data values, and the relationship data values, wherein the populating includes applying evaluation criteria-rating pair values, traversing the graph data structure to identify one or more problems indicated by the evaluation criteria-rating pair values, in response to the traversing, determining one or more changes to the graph data structure to satisfy one or more identified problems, if the determination is affirmative, populating a solution graph data structure that satisfies one or more identified problems, and transmitting, to the electronic device, a response to the input.

13 Claims, 3 Drawing Sheets

SYSTEM AND METHOD FOR NATURAL LANGUAGE PROCESSING

FIELD OF TECHNOLOGY

The present disclosure relates to natural language processing. Certain embodiments provide a system and method for natural language processing.

BACKGROUND

Various techniques have been developed for natural language processing. Past approaches, including those using semantic networks to represent knowledge, or relationships between concepts, can suffer from several disadvantages, including that such techniques may not be adapted for continuous or contextualized use in a variety of settings or domains, for learning, and/or for providing responses to input for which there has not been previously constructed responses to known problems or situations.

Improvements in systems and methods for natural language processing are desirable, including those for generating responses to natural language input queries or problems where there is no specific prior knowledge requirement.

The foregoing examples of the related art and limitations related thereto are intended to be illustrative and not exclusive. Other limitations of the related art will become apparent to those of skill in the art upon a reading of the specification and a study of the drawings.

BRIEF DESCRIPTION OF THE DRAWINGS

Examples are illustrated with reference to the attached figures. It is intended that the examples and figures disclosed herein are to be considered illustrative rather than restrictive.

DETAILED DESCRIPTION

The following describes a method in a server having a processor, a memory, and a network interface device that includes storing, in the memory, a graph data structure comprising a plurality of nodes, each node associated with an entity data value, and a plurality of links, wherein each link connects two nodes and is associated with a relationship data value and one or more evaluation criteria-rating pair values, receiving, at the network interface device, an input for response from an electronic device, parsing the input to identify one or more entity data values and one or more relationship data values, populating the graph data structure with the identified entity data values, and the relationship data values, wherein the populating includes applying evaluation criteria-rating pair values, traversing the graph data structure to identify one or more problems indicated by the evaluation criteria-rating pair values, in response to the traversing, determining one or more changes to the graph data structure to satisfy one or more identified problems, if the determination is affirmative, populating a solution graph data structure that satisfies one or more identified problems, and transmitting, to the electronic device, a response to the input.

Throughout the following description, specific details are set forth in order to provide a more thorough understanding to persons skilled in the art. However, well-known elements may not be shown or described in detail to avoid unnecessarily obscuring of the disclosure. Accordingly, the description and drawings are to be regarded in an illustrative, rather than a restrictive, sense.

This disclosure relates generally to natural language processing and particularly to systems and methods for natural language processing using artificial intelligence techniques.

Figure 1:
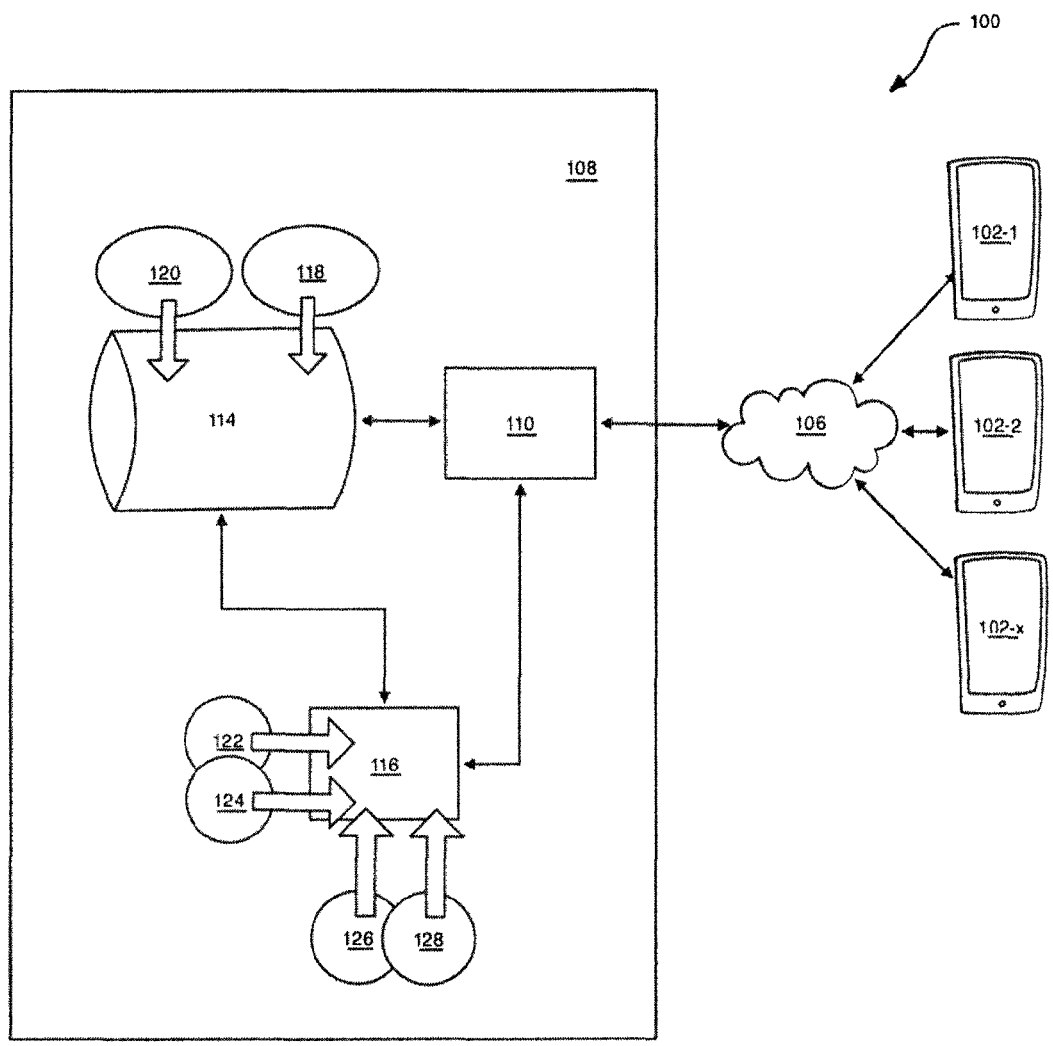
FIG. 1 is a block diagram of a system for natural language processing in accordance with an example.

The following description provides, with reference to FIG. 1, detailed descriptions of exemplary systems for an artificial intelligence system for natural language processing. Detailed descriptions of corresponding computer-implemented methods are provided in connection with FIG. 2.

A block diagram of an example of a system 100 for natural language processing is shown in FIG. 1.

According to this example, the system 100 includes one or more electronic devices 102-1, 102-2, . . . 102-x (generically referred to herein as "electronic device 102" and collectively as "electronic devices 102"; this nomenclature will also be used for other elements herein), all of which are connected to a server 108 via a network 106.

The server 108 is typically a server or mainframe within a housing containing an arrangement of one or more processors 116, volatile memory 114 (i.e., random access memory or RAM), persistent memory 114 (e.g., hard disk devices), and a network interface device 110 (to allow the server 108 to communicate over the network 106) all of which are interconnected by a bus. Many computing environments implementing the server 108 or components thereof are within the scope of the invention. The server 108 can include a pair of servers for redundancy, connected via the network 106 (e.g., an intranet or across the Internet) (not shown).

The server 108 can be connected to other computing infrastructure including displays, printers, data warehouse or file servers, and the like (not shown in FIG. 1).

The server 108 includes a network interface device 110 interconnected with the processor 116. The network interface device 110 allows the server 108 to communicate with other computing devices such as the electronic devices 102 via a link with the network 106, or via a direct, local connection (such as a Universal Serial Bus (USB) or Bluetooth™ connection, not shown). The network 106 can include any suitable combination of wired and/or wireless networks, including but not limited to a Wide Area Network (WAN) such as the Internet, a Local Area Network (LAN), HSPA/EVDO/LTE cell phone networks, WiFi networks, and the like.

The network interface device 110 is selected for compatibility with the network 106, as well as with local links as desired. In one example, the link between the network interface device 110 and the network 106 is a wired link, such as an Ethernet link. The network interface device 110 thus includes the necessary hardware for communicating over such a link. In other examples, the link between the server 108 and the network 106 can be wireless, and the network interface device 110 can include (in addition to, or instead of, any wired-link hardware) one or more transmitter/receiver assemblies or radios, and associated circuitry.

The server 108 can include a keyboard, mouse, touch-sensitive display (or other input devices), a monitor (or display, such as a touch-sensitive display, or other output devices) (not shown in FIG. 1).

The server 108 stores, in the memory 114, a plurality of computer readable instructions executable by the processor 116. These instructions can include an operating system ("OS") and a variety of applications. Among the applications in the memory 114 is an application 104 (also referred to herein as "application 104"; not shown in FIG. 1). When the processor 116 executes the instructions of application 104, the processor 116 is configured to perform various functions specified by the computer readable instructions of the application 104, as will be discussed below in greater detail.

The server 108 can also store in the memory 114, a graph data structure 118, and a metadata database 120 as discussed below in greater detail. The memory 114 can also store transmissions including input messages and response messages between one or more of the electronic devices 102 and the server 108. The graph data structure 118 refers to a collection of nodes, links, and evaluation criteria-rating pairs that can be represented or stored in the memory 114 as data variables, arrays, fields, and pointers.

Typically, the electronic devices 102 are associated with users who provide natural language input for response from the server 108. The electronic device 102 can be any of a desktop computer, smart phone, laptop computer, tablet computer, and the like. The electronic device 102 can include one or more processors, a memory, input and output devices (typically including a display, a speaker, a microphone, and a camera), and a network interface device as described above in connection with the server 108 (not shown in FIG. 1). An electronic device 102 can be operated by a user.

The electronic device 102 exchanges messages with the server 108, via the network 106 using a client application 112 (not shown in FIG. 1) loaded on the electronic device 102. In one example, the client application 112 can be a web browser or native application that uses a web-based or mobile interface and exchanges messages including natural language input for response.

According to some examples, the client application 112 can receive spoken natural language input captured by the microphone of the electronic device 102 and converted to text input by the electronic device 102 or, in some cases, the server 108. The spoken natural language input can be processed using known voice-to-text technology.

In one alternative example, the electronic device 104 can be a crawling engine (not shown in FIG. 1). A crawling engine is a server or application that provides functionality for automated "bot" or web crawling of data sources, in the case of the Internet or a database query processor in the case of an intranet, or an enterprise or institutional database system. According to this example, the crawling engine provides natural language input from crawled web pages or text or other media assets located in such enterprise or institutional databases, intranets or on the Internet. The crawling engine may identify problems and identify and "learn" new entity data values, relationship values and evaluation criteria-rating pair values, as those terms are discussed below.

As mentioned above, the memory 114 maintains a graph data structure 118 and a metadata database 120. The metadata database 120 can be a database application loaded on the server 108, a stand-alone database server or a virtual machine in communication with the network interface device 110 of the server 108, or any other suitable database.

Figure 3:
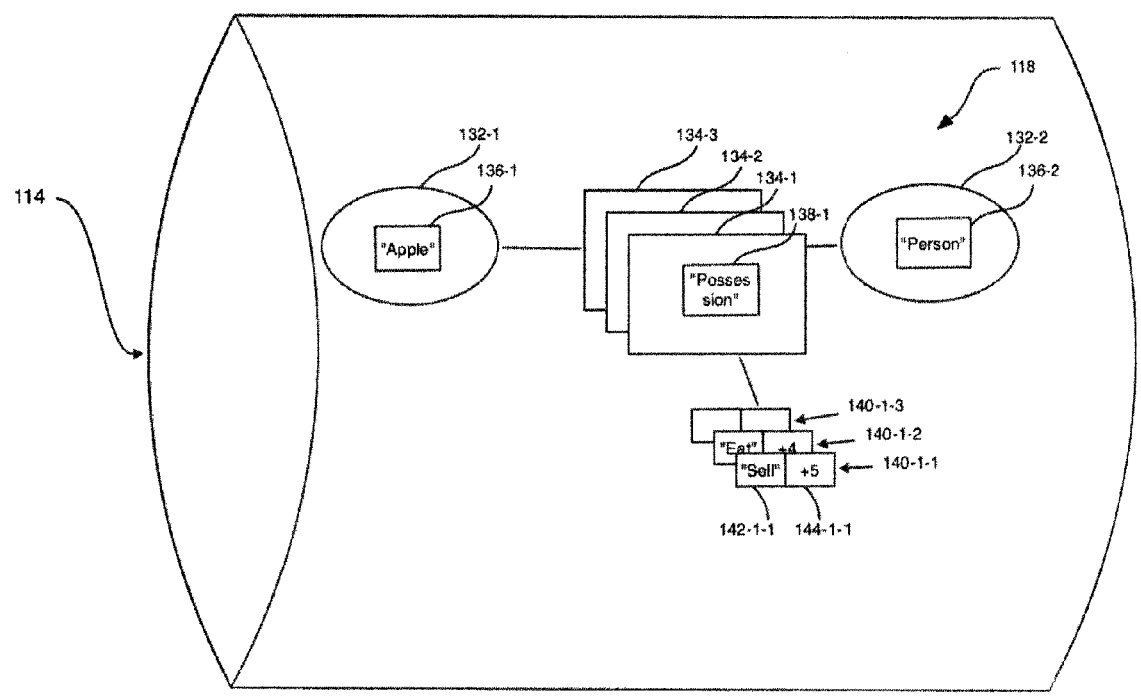
FIG. 3 is a block diagram of a memory of the system of FIG. 1.

The memory 114 maintains one or more graph data structures 118-1, 118-2, . . . , 118-m. An example graph data structure 118 is shown in FIG. 3. The graph data structure 118 includes a plurality of nodes 132-1, 132-2, . . . 132-n (e.g., two nodes are shown in FIG. 3) and a plurality of links 134-1, 134-2, . . . 134-o (e.g., three links are shown in FIG. 3). Each node 132 is associated with an entity data value 136. The entity data value 136 corresponds to an object (e.g., "apple", "seed") or to a concept (e.g., "hunger"). Two nodes 132 can be connected by one or more links 134. A link 134 can be associated with one or more relationship data values 138 and one or more evaluation criteria-rating pair values 140. The relationship data value 138 corresponds to a "type" of relation between two entity data values 136 (e.g., "possession", "contains", "exhibits"). Two nodes 132 can be linked where a relationship is detected (e.g., an "apple" "contains" "seed(s)"). The evaluation criteria-rating pair value 140 refers to an evaluation criteria label 142 and an associated rating value 144 (e.g., <"sell", +5>, <"eat", +4>).

The metadata database 120 maintains one or more electronic records for populating the graph data structures 118, as discussed below. Typically, the metadata database 120 includes a table of text strings that indexes or associates a given text string with entity data values 136 or relationship data values 140. Furthermore, the metadata database 120 includes a table of known evaluation criteria-rating pair values 140 corresponding to two entity data values 136 and one relationship data value 140 (also referred to as entity data value pairs). Two entity data values 136 can be associated with multiple relationship data values 140 and each relationship data value 140 can be associated with multiple evaluation criteria-pair values 140.

Still with reference to FIG. 1, the system 100 further includes a parsing routine 122, a graph population routine 124, a graph traversal routine 126, and an evaluation routine 128. In one example, the system 100 can include a crawling routine 129. These routines, sometimes referred to as modules or engines, are described below, with reference to the methods of FIG. 2. Typically, each of the routines comprises instructions, for example by way of application 104, to determine the functioning of the processor 116 of the server 108. In other examples, however, some of or all the routines may be part of other applications, servers, or other computing infrastructure. In this case, the method steps may communicate with components of the server 108 including the graph data structure 118 or the metadata database 120 via the network interface device 110.

Figure 2:
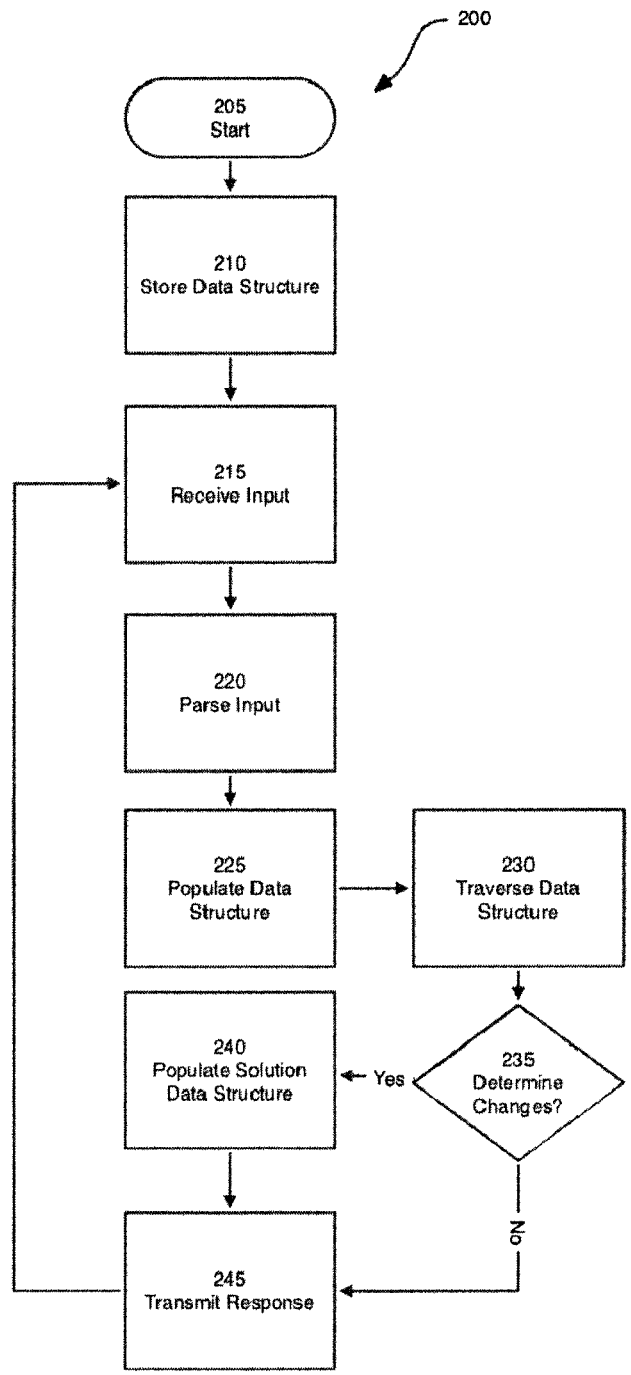
FIG. 2 is a flowchart illustrating a method for natural language processing in accordance with an example.

A flowchart illustrating an example of a disclosed method of natural language processing is shown in FIG. 2. This method can be carried out by the application 104 or other software executed by, for example, the processor 116 of the server 108. The method can contain additional or fewer processes than shown and/or described, and can be performed in a different order. Computer-readable code executable by at least one processor 116 of the server 108 to perform the method can be stored in a computer-readable storage medium, such as a non-transitory computer-readable medium.

With reference to FIG. 2, a method 200 starts at 205 and, at 210, the server 108 is configured to store, in the memory 114, a graph data structure 118 including a plurality of nodes 132, each node 132 associated with an entity data value 136, and a plurality of links 134 wherein each link 134 connects two nodes 132 and is associated with a relationship data value 138 and one or more evaluation criteria-rating pair values 140.

At 215, the network interface device 110 receives an input for response. The input for response can be received from the electronic device 102. The input for response can be stored in the memory 114. In one example, the input for response can be text input. In other examples, the input for response can be speech-to-text input. With reference to FIG. 3, the example input for response is "I have an apple and I am hungry".

At 220, the parsing routine 122 provides logic for the processor 116 to parse, or convert, the input for response that is received from the electronic device 102. In one example, the input for response is converted into one or more strings of text. The strings may be compared against the strings (or a dictionary of strings) maintained in the metadata database 120. If a match is detected, then the metadata database 120 passes or returns one or more parameters, or data values, to the graph population routine 124 (discussed below), associated with the recognized string. For example, the recognized string can be associated with an entity data value 136 or a relationship data value 138. The parsing routine 122 can be invoked for each string in the input for response. In the example of FIG. 3, the input "I" may be recognized as a "person" entity data value 136-2 (i.e., "I" and "person" can be associated in the dictionary of strings), the input "have" may be recognized as a "possession" relationship data value 134-1 (i.e., again using the dictionary of strings), and the input "an apple" may be recognized as an "apple" entity data value 136-1. FIG. 3 illustrates additional links 134-2 and 134-3 to indicate that other relationship data values 136-2 and 136-3, respectively, may be detected by the parsing routine 122 (not shown in FIG. 3).

Thereafter, at 225 of FIG. 2, the graph population routine 124 provides logic for the processor 116 to populate the graph data structure 118 with nodes 132 (and associated entity data values 136) and links 134 (and associated relationship data values 140) recognized from the parsed input for response. Upon populating the nodes 132 and the links 134, the metadata database 120 is also consulted to populate the graph data structure 118 with known evaluation criteria-rating pair values 140. In one example, the evaluation criteria-rating pair values 140 include rating values 144. In one example, the rating values 144 can correspond to nominal human values (or regional or cultural human values) that may be pre-populated in the metadata database 120. For example, rating values 144 can be assigned to evaluation criteria label values 142 such as "eat" or "sell". In another example, the rating values 144 can correspond to personal individual values documented in the metadata database 120. For example, rating values 144 can be assigned to evaluation criteria label values 142 to reflect how an individual values concepts such as "family", "honour", "punctuality", etc. In other examples, the rating values 144 can correspond to values with reference to the laws of chemistry, mathematics, physics, and the like. More than one evaluation criteria-rating pair value 140 can be assigned to the same link 134 simultaneously. In the example of FIG. 3, three evaluation criteria 140-1-1, 140-1-2, and 140-1-3 are associated with the relationship data value 138-1 and link 134-1.

As mentioned, the method 200 continues at 220, where the server 108 populates the graph data structure 118 with the parsed entity data values 136, the parsed relationship data values 138 and the evaluation criteria-rating pair values 140.

Advantageously, by employing the methods disclosed herein, the graph data structure 118 can be populated with data values to represent various scenarios. Through the use of the methods described herein, extensive contextual situation or even domains of knowledge can be efficiently captured in the memory 114.

Still with reference to FIG. 2, the method 200 continues at 230 where the server 108 traverses the populated graph data structure 118 to identify one or more queries, or problems, indicated by the evaluation criteria-rating pair values 140. Step 230 can be executed by the graph traversal routine 126 that visits all the nodes 136 of the graph data structure 118. In one implementation, the graph traversal routine 126 provides logic for the processor 116 to traverse the populated graph data structure 118 in order to identify queries, or problems, and to enumerate possible solutions, or changes, to the graph data structure 118 to satisfy at least one of, and in some cases, all of the identified problems. Problems are identified or detected by reference to the evaluation criteria-rating pair values 140. In one example, a negative rating value indicates a problem. For example, given an input of response consisting of the phrase "I am hungry", an evaluation criteria-rating pair 140-2 can be populated in the graph data structure 118. In this example, the evaluation criteria-rating pair 140-2 can be −5 (minus 5) to indicate the existence of a query or problem with respect to the "person". Upon traversal of the graph data structure 118 of FIG. 3, the problem is identified (e.g., the "person" is "hungry") and possible problems are enumerated (e.g., the person is hungry is the only problem in the example graph data structure 118).

Advantageously, one or more problems for resolution can be identified using the graph traversal routine 126.

Still with reference to FIG. 2, at 235, the logic provided to the processor 116 of the server 108 by the evaluation routine 128 determines at least one change, that is, seeks to develop at least one solution, to the graph data structure 118 to satisfy at least one of, or in some cases, all the identified problems. According to the determining step the processor 116 queries the metadata database 120 to locate possible solutions to the problem through other entity-relationship-evaluation criteria information stored in the meta database 120 based on information available within the given graph data structure 118. In this example, the processor 116 queries the metadata database 120 with the "person"–"possesses"–"hunger" problem (data entity relationship) and further query "hunger" to determine that "food" can have a reducing effect on hunger (a correlation between "food" and "hunger" based on the nominal evaluation criteria-rating pair between these two entities in the metadata database 120). The graph traversal routine 126 further searches the existing graph data structure 118 for possible solutions to the food requirement. In this example, the graph traversal routine 126 would locate "apple" and through further query to the metadata database 120, determine that apple "is a type of" (relationship) "food". In such case, the processor 116 determines a solution graph data structure and stores it in the memory 114.

If the determination is affirmative, then at 240, the evaluation routine 128 of the server 108 creates a solution graph data structure 118 to satisfy the one or more of the identified problems. Similar graph data structures are developed and stored in the memory 114 for other possible solutions that can be constructed for each problem (in the example there is only one problem). Through further logic in the processor 116, the graph traversal routine 126 calculates, based on the net value of each graph data structure 118 on the subject "person" and calculates, through analysis of the evaluation criteria-value rating pairs 140, the best or optimal solution based on highest net value to "person". In this case the highest net value would be produced by the graph data structure 118 where the person eats the apple.

At 245, a process executed by the server 108 using grammatical techniques transmits a response after calculation based on the selected solution graph data structure 118 and the response is communicated via the network interface device 110 across the network 106, to the electronic device 102. The response can be a text response displayed on a display of the electronic device 102, a text-to-speech response on a speaker of the electronic device 102, or an audio-video response using the display and the speaker. In an alternative example, where the electronic device is a crawling engine, the processor 116 is configured to transmit a response to a solution database for further evaluation.

In cases where no apparent solutions can be constructed from the graph data structure 118, the processor further queries the metadata database 120 in order to determine or identify more general solutions which may, for example, result in such response as "You should locate and eat some food."

According to one example, the client application 112 that is loaded on the electronic device 102 (operated by the user) provides a "questionnaire" or online form to assist with populating the graph data structure 118, including clarification and updates of the metadata database 120 where new entity data values 136, relationship data values 138, or evaluation criteria-rating pair values 140 can be "learned". A wide variety of machine learning or artificial intelligence techniques can be utilized.

Advantageously, the system 100 provides techniques for adjusting or changing the contents of the metadata database 120 according to machine learning or artificial intelligence approaches.

In one example, the input for response can include a user-selected motivation data value 168 (not shown in the figures) that sets a mode of operation. In one example, the motivation data value 168 can be one of conversational, educational/research, consultative/counseling, etc. The motivation data value 168 can change the logic provided to the processor 116 to create and format of the responses to the input that are suitable for the user and his/her situation.

A method in a server having a processor, a memory, and a network interface device includes storing, in the memory, a graph data structure comprising a plurality of nodes, each node associated with an entity data value, and a plurality of links, wherein each link connects two nodes and is associated with a relationship data value and one or more evaluation criteria-rating pair values, receiving, at the network interface device, an input for response from an electronic device, parsing the input to identify one or more entity data values and one or more relationship data values, populating the graph data structure with the identified entity data values, and the relationship data values, wherein the populating includes applying evaluation criteria-rating pair values, traversing the graph data structure to identify one or more problems indicated by the evaluation criteria-rating pair values, in response to the traversing, determining at one or more changes to the graph data structure to satisfy one or more identified problems, if the determination is affirmative, populating a solution graph data structure that satisfies one or more identified problems, and transmitting, to the electronic device, a response to the input.

The input for response can be one of a text input, a speech-to-text input, and an audio-video input.

The response can be a natural language representation of the solution graph data structure. The response can be calculated and formatted according to a motivation data value selected from one of: a conversational data value, an educational/research data value, and a consultative/counseling data value. The response can be selected from one of: a text response, a text-to-speech response, and an audio-video response.

The traversing includes visiting each node of the graph data structure. The problems are identified when, after traversing, a calculation including a rating pair value of the evaluation criteria-rating pair values is a negative value. The evaluation criteria-rating pair values can be generated by accessing a metadata database including pre-determined individual personal values.

A system includes a server having a processor that is connected to a network interface device and a memory. The processor is configured to store, in the memory, a graph data structure comprising a plurality of nodes, each node associated with an entity data value, and a plurality of links, wherein each link connects two nodes and is associated with a relationship data value and one or more evaluation criteria-rating pair values, receive, at the network interface device, an input for response from an electronic device, parse the input to identify one or more entity data values and one or more relationship data values, populate the graph data structure with the identified entity data values, and the relationship data values, wherein the populating includes applying evaluation criteria-rating pair values, traverse the graph data structure to identify one or more problems indicated by the evaluation criteria-rating pair values, in response to the traversing, determine at least one change to the graph data structure to satisfy one of the identified problems, and if the determination is affirmative, populate a solution graph data structure that satisfies the one of the identified problems.

The electronic device can be one of: a desktop computer, a smart phone, a laptop computer, and a tablet computer. The processor can be configured to transmit, to the electronic device, a response to the input. Alternatively, the electronic device can be a crawling engine. The processor can be configured to transmit, to a solution database for further evaluation, a response to the input.

While a number of exemplary aspects and examples have been discussed above, those of skill in the art will recognize certain modifications, permutations, additions and sub-combinations thereof.

What is claimed is:

1. A method in a server having a processor, a memory, and a network interface device comprising:
    storing, in the memory, a graph data structure comprising a plurality of nodes, each node associated with an entity data value, and a plurality of links, wherein each link connects two nodes and is associated with a relationship data value and one or more evaluation criteria-rating pair values;
    receiving, at the network interface device, an input for response from an electronic device;
    parsing the input to identify one or more entity data values and one or more relationship data values;
    populating the graph data structure with the identified entity data values, and the relationship data values, wherein the populating includes applying evaluation criteria-rating pair values;
    traversing the graph data structure to identify one or more problems indicated by the evaluation criteria-rating pair values;
    in response to the traversing, determining one or more changes to the graph data structure to satisfy one or more of the identified problems;
    when the determination is affirmative, populating a solution graph data structure that satisfies one or more of the identified problems; and
    transmitting, to the electronic device, a response to the input.

2. The method of claim 1 wherein the response comprises a natural language representation of the solution graph data structure.

3. The method of claim 1 wherein the input for response is selected from one of: a text input, a speech-to-text input, and an audio-video input.

4. The method of claim 3 wherein the response is calculated and formatted according to a motivation data value.

5. The method of claim 4 wherein the motivation data value is selected from one of: a conversational data value, an educational/research data value, and a consultative/counseling data value.

6. The method of claim 5 wherein the response is selected from one of: a text response, a text-to-speech response, and an audio-video response.

7. The method of claim 6 wherein the evaluation criteria-rating pair values are generated by accessing a metadata database comprising pre-determined individual personal values.

8. The method of claim 1 wherein the problems are identified when, after traversing, a calculation including a rating pair value of the evaluation criteria-rating pair values is a negative value.

9. The method of claim 1 wherein the evaluation criteria-rating pair values are generated by accessing a metadata database comprising pre-determined individual personal values.

10. The method of claim 1 wherein the electronic device is selected from one of: a desktop computer, a smart phone, a laptop computer, and a tablet computer.

11. A system comprising:
a server having a processor and connected to a network interface device and a memory, wherein the processor is configured to:
store, in the memory, a graph data structure comprising a plurality of nodes, each node associated with an entity data value, and a plurality of links, wherein each link connects two nodes and is associated with a relationship data value and one or more evaluation criteria-rating pair values;
receive, at the network interface device, an input for response from an electronic device;
parse the input to identify one or more entity data values and one or more relationship data values;
populate the graph data structure with the identified entity data values, and the relationship data values, wherein the populating includes applying evaluation criteria-rating pair values;
traverse the graph data structure to identify one or more problems indicated by the evaluation criteria-rating pair values;
in response to the traversing, determine at least one change to the graph data structure to satisfy one of the identified problems; and
when the determination is affirmative, populate a solution graph data structure that satisfies the one of the identified problems.

12. The system of claim 11 wherein the electronic device is selected from one of:
a desktop computer, a smart phone, a laptop computer, and a tablet computer and wherein the processor is configured to transmit, to the electronic device, a response to the input.

13. The system of claim 11 wherein the electronic device is a crawling engine and wherein the processor is configured to transmit, to a solution database for further evaluation, a response to the input.

* * * * *